March 21, 1961  K. B. SORENSEN ET AL  2,975,840
MARKERS FOR PLANTERS

Filed Oct. 8, 1956  3 Sheets-Sheet 3

INVENTORS.
KNUD B. SORENSEN
WALDO D. MARTIN
BY
ATTORNEYS

United States Patent Office 2,975,840
Patented Mar. 21, 1961

2,975,840

MARKERS FOR PLANTERS

Knud B. Sorensen and Waldo D. Martin, Rock Island, Ill., assignors, by mesne assignments, to Deere & Company, a corporation of Delaware Filed Oct. 8, 1956, Ser. No. 614,665

4 Claims. (Cl. 172—128)

The present invention relates generally to agricultural implements and more particularly to ground working and ground engaging implements, such as a planter, for example, having row marking means.

The object and general nature of the present invention is the provision of a new and improved marker control for implements of the type that are adapted to be carried by a tractor and raised and lowered by the latter into and out of transport and working positions, with means responsive to the movement of the implement relative to the tractor for automatically raising and lowering the markers under the selective control of the operator.

More specifically, it is a feature of this invention to provide a marker control that is so constructed and arranged that the markers are raised with a delayed action so that even though the implement be raised in a relatively short period of time, the markers are not swung upwardly into their raised position with objectionable velocity or acceleration. For example, there are many instances in which an implement, such as a tractor mounted planter of the lift type, in which the implement is raised from its operating position to its transport position in about one and one-half seconds, but it has been found that in cases where such an implement is equipped with a marker arm that extends, when lowered, laterally outwardly and is swung upwardly to a generally vertical position when the implement is arranged for transport, the direct connection of the marker arm with a planter that would cause the raising of the marker arm to be accomplished in the same length of time, namely one and one-half seconds, imparts a considerable velocity to the marker arm so that when the latter reaches its upper position, it strikes associated structure with a considerable impact, and further, in an implement of this kind, the marker arms are raised to positions generally alongside the operator on the tractor, and the excessive velocity imparted to the marker arms when raising them in the above mentioned one and one-half seconds, creates the appearance, if not the reality, of a serious hazard and possibility of injury to the operator that is exceedingly disconcerting.

Accordingly, it is an important feature of this invention to provide means for retaining the rapid raising of the implement as a whole while delaying the raising of the marker arm. Particularly, according to this invention, this result is secured by incorporating a spring in the lifting connections for the marker arm so that when the implement is raised energy is stored in the spring, as by stretching it, due to the resisting inertia of the marker arms in their lowered position, which energy is available even after the implement has reached its transport position to continue the raising of the marker arms. Further, as energy is withdrawn from the biased spring, the force exerted by the latter progressively decreases so that the marker arms are brought to their raised position in a relatively easy manner that does not result in objectionable impacts or too great a velocity in the raising direction.

An additional feature of this invention is the provision of means incorporated in the marker raising connection so that at a point adjacent the completion of the raising of the implement, and after the spring has been biased to a considerable extent, a direct positive connection is established so as to insure the initial movement of the marker arms out of their lowered position, starting them toward their raised position. However, the parts are so constructed and arranged that after this initial movement has been imparted to the marker arms, the biased spring takes over and continues the raising of the marker arms into their raised position.

These and other objects and advantages of the present invention will be apparent to those skilled in the art after a consideration of the following detailed description, taken in conjunction with the accompanying drawings, in which.

Figure 1:
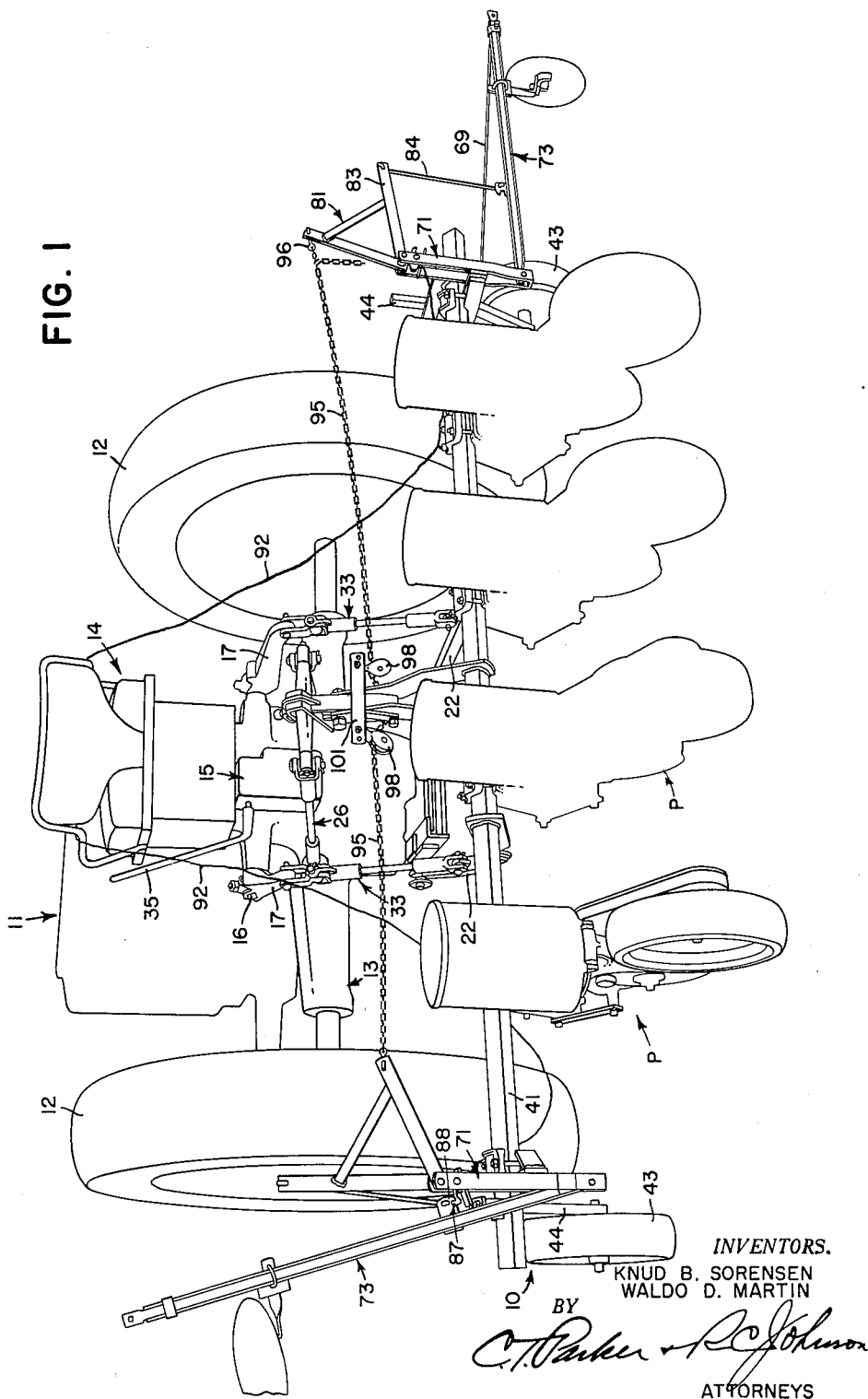
Fig. 1 is a rear view of a tractor mounted planter in which the principles of the present invention have been incorporated.

Referring first to Fig. 1, the implement is indicated in its entirety by the reference numeral 10, and is shown as mounted on a conventional farm tractor 11. The latter includes a pair of rear drive wheels 12 mounted on an axle structure 13 carried at the rear of the tractor and over which an operator's station, such as as a seat 14, is disposed. The tractor also includes power lift means 15 which includes a rockshaft 16 on the ends of which lift arms 17 are fixed. Connected to the rear lower portion of the tractor, for example, to the lower rear drawbar structure 21, is a pair of lower draft links 22 that are vertically swingable relative to the tractor, being connected to the side members of the drawbar support structure 21 by ball joint means 25. Upper link means 26, comprising a pair of rearwardly extending links 27 and 28, is connected with the rear portion of the tractor above the lower draft links 22, and the links 27 and 28 are interconnected by a crossbar 29, the ends of which are connected by suitable means 31 to the rear ends of the links 27 and 28. Both the upper and lower link means are adapted to be raised and lowered relative to the tractor by means of a pair of links 33 that at their lower end are connected with the lower draft links 22 and at their upper ends with the power lift arms 17. The tractor power lift mechanism 15 is under the control of a valve lever 35, and by moving the latter forwardly, the lower draft links 22 are raised, and by moving the valve lever 35 rearwardly, the draft links 22 are lowered. The upper link means 26 when connected with an associated implement, such as the planter indicated at 10, move upwardly and downwardly with the lower links 22.

The present invention is not to be limited to any particular type of implement, but for convenience in illustrating one form of the present invention, the implement 10 is in the form of a toolbar planter of the type that is adapted to be directly connected with the tractor. The planter 10 comprises a transverse toolbar 41 disposed immediately rearwardly of the tractor wheels 12 and connected by any suitable mounting means to the rear ends of the tractor draft links 22. The toolbar 41 extends outwardly beyond the drive wheel 12 and carries suitable gauge wheels 43 journaled on the lower ends of gauge wheel attaching standards 44, the latter being connected, preferably adjustably, to the toolbar 41 by any suitable means. Secured to the generally central portion of the toolbar 41, and forming with the latter an implement frame means, is a generally vertically extending mast structure 46, preferably consisting of a pair of vertical bars 47 and 48 secured, as by welding, at the lower ends to the toolbar 41 and connected at the upper ends to an attaching bracket 51, connected to the bars 47 and 48 by bolt means 52 and provided with a forwardly facing socket 53 adapted to receive the crossbar 29 of the upper link means of the tractor. The transverse bar 29 is held in place in the upper end of the attaching bracket 51 by a quick removable pin 55.

According to the principles of the present invention, the planter 10 is provided with marker arm means and connections between the latter and the tractor so that whenever the planter is raised into a transport position, the marker arm means is raised into an inoperative position, and when the implement is lowered into its ground working operating position one or the other of the marker arms may be selected to be lowered, either as the implement is lowered or later, at the option of the tractor operator.

Fixed to each end of the transverse toolbar 41 is a marker arm supporting bracket structure 60. This comprises a pair of generally fore-and-aft extending bars 61, each having a notch 62 to receive the lower side of the associated toolbar 41, and the lower rear portions of the bar 61 are interconnected by a horizontal plate 63 that is apertured to receive a pair of bolts 64 by which a clamping cap 65, disposed on the upper side of the toolbar 41, is secured to the lower fore-and-aft extending bars 61. The upper edges of the forward portions of the bars 61 slope downwardly and receive, as by welding, the forwardly extending brace rod receiving section 67, the forward end of which is downturned and apertured, as shown at 68, to receive a marker arm brace rod 69. Secured to the outer bar 61, as by welding, is a vertical U-shaped bracket 71 having its lower portion extending downwardly below the bar 61 and apertured to receive a pivot pin 72 by which the inner end of the associated marker arm 73 is connected with the bracket structure 60 for generally vertical swinging movement. The marker arm 73 is longitudinally adjustable, comprising two sections 74 and 75 arranged in telescopic relation, the inner section 75 receiving clamp means 77 by which the outer end of the brace rod 69 is fixedly connected therewith.

Figure 4:
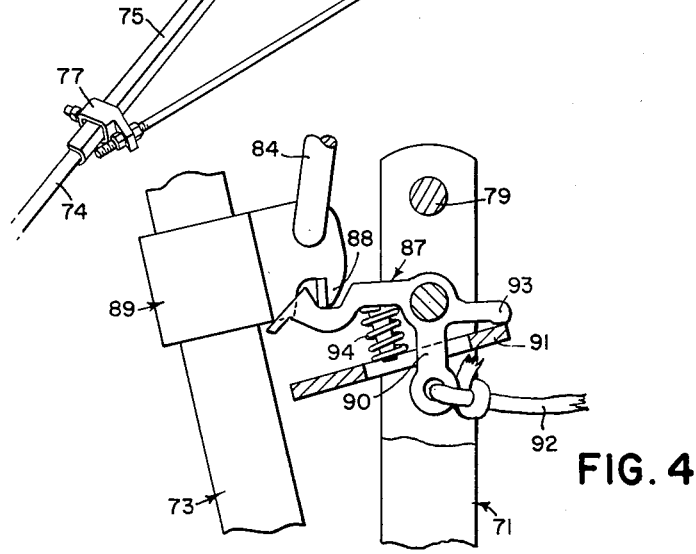
Fig. 4 is a fragmentary detail view, partly in section, of the marker arm latch structure.

The upper end of the bracket 71 is apertured to receive a pivot pin 79 that swingably supports a bell crank 81, the latter including a generally vertical arm 82 and a generally laterally outwardly extending horizontal arm 83. The outer end of the generally horizontal arm 83 is connected by a link 84 with the associated marker arm 73, whereby rocking of the bell crank 81 in a generally transverse vertical plane results in raising and lowering the marker arm 73. Disposed immediately below the bell crank is a marker arm latch lug 87 having a hook end that is adapted to be engaged with the hook portion 88 of the bracket 89 that connects the link 84 with the marker arm 73, when the latter is raised into its vertical or transport position. An end 90 of the latch 87 extends downwardly through an opening in a stop plate 91 that is fixed, as by welding, to the side portions of the U-shaped bracket 71, and to this end of the lug 87 a control rope 92 is connected. As best shown in Figure 4, a stop extension 93 on the latch 87 contacts the inner end of the plate 91. A spring 94 moves the latch into marker arm engaging position. There is a marker supporting bracket and associated parts described above at each end of the toolbar 41. Both control ropes 92 extend forwardly to a point closely adjacent the operator's station 14 on the tractor.

The operating mechanism whereby the raising and lowering of the implement relative to the tractor automatically operates the marker arms is of special construction and will now be described. Secured to the generally upwardly extending arms 82 of the bell cranks 81 is a transversely disposed flexible element 95, preferably in the form of a cable or chain, the ends of the flexible element 95 being connected, respectively, to chain hook connectors 96, and the central portion of the flexible chain 95 extends through pulley blocks 98 carried on a support member 101 that is detachably connected to the upper portion of the implement mast structure 46. The support 101 includes a rear crossbar 102 that is apertured to receive eye bolts 103 that carry the pulley blocks 98, and the central or bight portion of the chain 95 extends through a forward pulley block 105 that is carried by the rear portion of a resilient structure 106. The latter includes a spring 107, the forward end of which is adjustably connected, as by an eye bolt 108, to a bracket 109 that is fixed directly to the rear part of the drawbar support 21 of the tractor. An extension limiting shackle means 111 is connected to limit the extension of the spring 106. The shackle limiting means 111 comprises two chain lengths 113 the end links of which are welded, respectively, to a pair of arcuate straps 114 and 115. The central portions of each of the strap members 114 and 115 are slotted, as at 116, to receive an associated connection, one of the connections being the eye bolt 108 that connects the lower end of the spring 107 to the tractor drawbar support bracket 108. The other connection is shown at 117 and serves to connect the upper end of the spring 107 to the pulley block 105.

Under normal conditions of operation, as shown in Fig. 1, when the implement has been lowered to bring the planting units P, only one of which is shown in detail in Fig. 1, into operating position, one of the marker arms is lowered while the other is raised. The raised marker arm is held in position by virtue of the associated latch 87. When the implement is to be raised into transport position it is also necessary to raise the down marker arm into a raised position, in which the marker arm extends generally vertically, thereby facilitating the passage of the outfit through gates, along narrow lanes and the like. Normally, the power lift unit of the tractor is so constructed and arranged as to raise the implement in a period of time of about one and one-half seconds, which is a fairly rapid rate but a desirable one since it facilitates the making of sharp quick turns at the end of the field.

It will be seen from Fig. 1 that in its operating position, the lower marker arm extends generally horizontally outwardly, and experience has shown that if the down marker arm is raised in substantially the same length of time, namely, one and one-half seconds, the marker arm swings upwardly with considerable acceleration, creating relatively large or objectionable impact forces. This is, at least in part, due to the fact that as the marker arms approach their raised position, they become almost vertical, and which position the effect of gravity, which is relatively great when the arms are in their horizontal or laterally outwardly extending position, becomes a minimum so that the raising effort required for the raising movement of the marker arms drops off rather sharply. A further result of this objectionable upward and laterally inwardly directed movement of the marker arms, when shifting them to their transport position, is to create the appearance of danger of the operator, at the operator's station 14 on the tractor, being hit by the upwardly and laterally inwardly moving marker arms. Actually, as can be seen from Fig. 1, this is not physically possible, but nevertheless a rapidly moving upwardly swinging marker arm creates the illusion of a hazardous condition, and is therefore objectionable to the operator who, at the time of making the turn, is required to give full attention to the manipulation of the tractor, and anything that detracts from this is a hazard.

Figure 2:
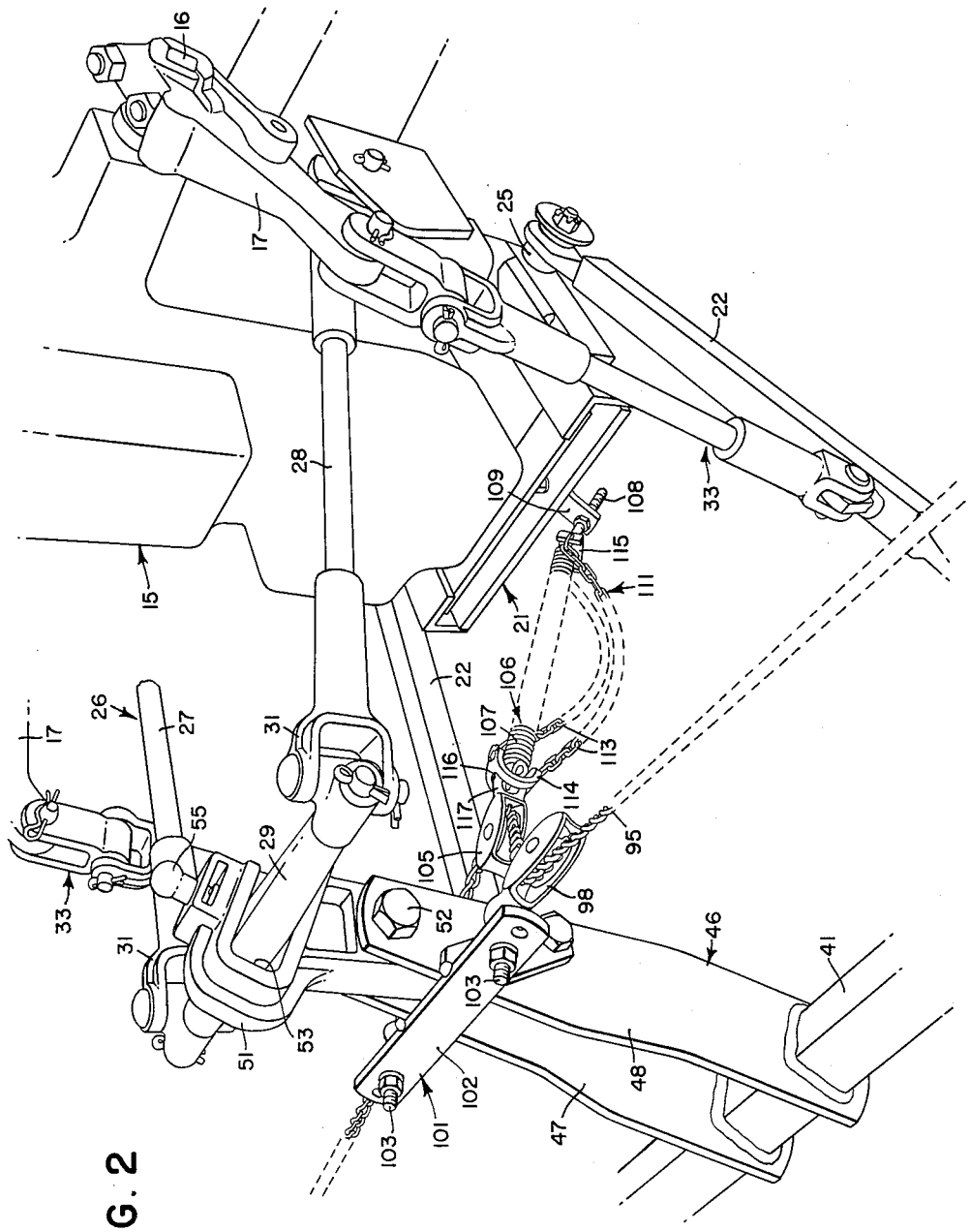
Fig. 2 is an enlarged perspective view showing the details of the connection between the tractor and the marker lifting chains.

According to the principles of the present invention we provide means whereby the raising of the marker arms is delayed beyond the relatively short period required for raising the implement. With particular reference to Fig. 2, from which it will be seen that the shackle chains 113 are slack, during the initial movement of the implement from its lowered position to its raised position, the upward movement of the implement acts through the spring 107, one end of which is anchored to the tractor drawbar support, to pull downwardly on the bight part of the marker arm lift chain 95. Due, however, to the weight and inertia of the down marker arm, the spring 107 is extended as the implement continues its upward movement and, with the proper adjustment at 108, the spring 107 becomes extended substantially to the full permissive extent at about the point where the shackle chains 113 become taut, and this normally occurs at about the time the implement has reached its raised position, which is at the end of the one and one-half second period mentioned above. Preferably, the parts are so arranged that just a moment before the implement reaches its raised position, the chains 113 go tight and at this moment a positive force is exerted through the lifting chain 95 to start the marker arm toward its raised position. In the meantime, due to a raising movement of the implement, the spring 107 has a substantial amount of energy stored therein, and this becomes available to continue the upward movement of the marker arms, and which movement has been started by the direct anchoring connection 113 at about the end of the raising movement of the implement. The spring 107 then continues to exert a force lifting the down marker arm upwardly into its raised or transport position. It will be noted that as the stretched spring retracts, its effective force decreases, but this occurs more or less as the marker arm approaches its raised position, and in which, therefore, a decreased force is still sufficient to continue the swinging of the marker arm. With the proper adjustment of the spring anchoring member 108, the spring is arranged to raise the marker arm into its completely raised position, in which position the catch latch 87 locks the marker arm in its raised position.

After the operator has turned the outfit around and is ready to start down the field, he actuates the power lift valve to lower the implement and also pulls on the rope connected with the latch that lowers the opposite marker arm into its operating position.

Figure 3:
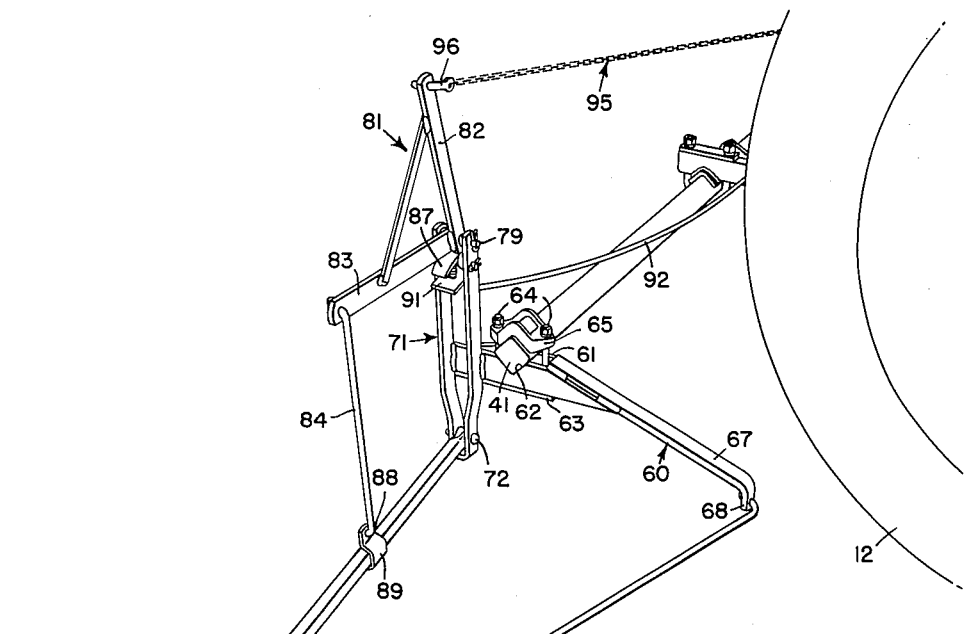
Fig. 3 is a fragmentary perspective view of the marker arm supporting bracket structure.

It will also be noted that, as can best be seen in Fig. 3, when the marker arm 73 is down the bell crank arm 83 extends outwardly divergingly relative to the marker arm 73. This relationship can also be seen in the right hand portion of Fig. 1. By virtue of this angular relationship, when the marker arm moves up toward its raised position its rate of movement is gradually decreased as the link 84 comes into a substantially straight line relation with respect to the bell crank arm 83, which occurs at about the time the marker arm is raised and latched. Thus, the velocity of upward movement of the arm gradually decreases as the arm approaches its raised position, which eliminates substantially all excessive impacts caused by the arm striking the stop plate 91 with excessive force. Further, as the down marker arm approaches its raised position, less power is required to lift the marker arm, as the arm 83 and link 84 approach their straight line position, and this occurs when the spring 107 exerts a lesser force. Thus, the effect of the decreasing effort exerted by the spring 107 and also the effect of the bell crank arm 83 moving substantially into a straight line relation with the link 84, results in a gradual slowing down of the upward movement of the marker arms, thereby preventing excessive impacts and at the same time providing for easy operation in the raising of the marker arms.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In an agricultural implement adapted to be propelled by a tractor and having a part to be shifted relative to the tractor from one position to another by power in a relatively short period of time, the combination therewith of a marker carried by said part and adapted to be shifted between upper and lower positions, and means including a spring connected at one end with the marker and at the other end with the tractor, whereby when said part is shifted during said relatively short period of time said spring is biased so as to shift said marker into a raised position after the completion of movement of said part, and a substantially inextensible link extending generally alongside said spring and connected at its ends with both ends, respectively, of said spring, said inextensible link including lost motion and having a length, when said lost motion has been taken up, that is slightly less than the effective distance between said marker in the lower position and the point of connection of the spring with the tractor in the full raised position of the said part, whereby when the spring has been biased substantially the full permissible amount said link acts to transmit motion to said marker independently of said spring, so as to impart movement to said marker with sufficient force to overcome inertia of the marker and initiate movement of the latter toward its raised position, the force stored in the spring completing movement of the marker into its raised position.

2. The combination with a farm tractor having a lower drawbar support at the rear of the tractor and a pair of power operated generally vertically swingable draft links connected with the tractor, of an implement of the lift type having frame means, furrow opening means carried thereby, means connecting said frame means with said raising and lowering means, a pair of marker arms, one connected with each end of said frame means and swingable between an outwardly extending lowered position to an upwardly extending raised position, a cable extending transversely of the implement above said links and said drawbar support and having its ends connected with said marker arms, respectively, and a generally central bight portion, and a connection extending from said bight portion downwardly to the drawbar support of the tractor whereby the marker arm is raised whenever the implement frame means is raised.

3. The invention set forth in claim 2, further characterized by said connection comprising a pulley and block receiving said bight, a spring connecting said block with the drawbar support, and a chain extending from said drawbar support to said block and of such length that the chain is slack until the spring is stressed a substantial amount.

4. The combination with a tractor having a power lift apparatus and generally vertically swingable implement-receiving draft link means, of an implement adapted to be mounted on said draft link means and including implement frame means, marker arm means connected with said frame means for movement from a generally laterally outwardly extended operating position to a generally vertical position, a bell crank pivotally mounted on said frame means above said marker arm means and having two arms, a link pivotally connecting one of bell crank arms with said marker arm means, said one arm and link being constructed and arranged so that they move substantially into a straight line relation as the marker arm approaches its raised position, a spring connected at one end with the tractor, and a flexible element connected between the other end of said spring and the other bell crank arm, the latter being disposed at approximately a right angle to said flexible element when said marker arm means is in its lowered position.

References Cited in the file of this patent

UNITED STATES PATENTS

| | | |
|---|---|---|
| 2,336,410 | McKay | Dec. 7, 1943 |
| 2,376,464 | White | May 22, 1945 |
| 2,455,727 | Bunting | Dec. 7, 1948 |
| 2,591,711 | Moore | Apr. 8, 1952 |
| 2,604,027 | Hansen | July 22, 1952 |
| 2,748,686 | Nelson | June 5, 1956 |
| 2,786,405 | Murphy et al. | Mar. 26, 1957 |
| 2,795,180 | Christofferson | June 11, 1957 |
| 2,843,034 | Doran | July 15, 1958 |
| 2,856,833 | Pereira et al. | Oct. 21, 1958 |